US011163790B2

(12) United States Patent
Love

(10) Patent No.: US 11,163,790 B2
(45) Date of Patent: *Nov. 2, 2021

(54) PROGRESSIVE DATA DISTRIBUTION VISUALIZATION

(71) Applicant: Merck Sharp & Dohme Corp., Rahway, NJ (US)

(72) Inventor: Oriana Jeannette Love, Austin, TX (US)

(73) Assignee: Merck Sharp & Dohme Corp., Rahway, NJ (US)

( * ) Notice: Subject to any disclaimer, the term of this patent is extended or adjusted under 35 U.S.C. 154(b) by 122 days.

This patent is subject to a terminal disclaimer.

(21) Appl. No.: 16/737,323

(22) Filed: Jan. 8, 2020

(65) Prior Publication Data

US 2020/0218730 A1  Jul. 9, 2020

Related U.S. Application Data

(63) Continuation of application No. 16/038,077, filed on Jul. 17, 2018, now Pat. No. 10,552,445.

(51) Int. Cl.
*G06F 16/26* (2019.01)
*G06F 16/28* (2019.01)

(52) U.S. Cl.
CPC .......... *G06F 16/26* (2019.01); *G06F 16/287* (2019.01)

(58) Field of Classification Search
CPC .............................. G06F 16/26; G06F 16/287
USPC ........................................................ 707/738
See application file for complete search history.

(56) References Cited

U.S. PATENT DOCUMENTS

| | | | | |
|---|---|---|---|---|
| 9,779,151 | B2* | 10/2017 | Lu | G06F 3/0486 |
| 2008/0307369 | A1* | 12/2008 | Liu | G06T 11/206 |
| | | | | 715/855 |
| 2009/0235267 | A1* | 9/2009 | McKinney | G06F 11/328 |
| | | | | 718/104 |
| 2014/0282163 | A1* | 9/2014 | MacKinlay | G06Q 10/10 |
| | | | | 715/769 |
| 2015/0026606 | A1* | 1/2015 | Hill | G06F 3/0482 |
| | | | | 715/760 |
| 2016/0092529 | A1* | 3/2016 | Lu | G06F 16/26 |
| | | | | 715/771 |

(Continued)

OTHER PUBLICATIONS

United States Office Action, U.S. Appl. No. 16/038,077, dated May 31, 2019, 19 pages.

(Continued)

*Primary Examiner* — Kimberly L Wilson
(74) *Attorney, Agent, or Firm* — Fenwick & West LLP

(57) ABSTRACT

A bubble is displayed in a visualization that is based on a number of distinct values pertaining to the concept and on a number of records in the dataset including at least one of the distinct values pertaining to the concept. Furthermore, the dataset includes records from one or more databases organized into a concept hierarchy. The bubble includes, for a level of the concept hierarchy, a plurality of indicators each representing one of the distinct values at the level of the concept hierarchy. An interaction with the bubble visualization is received. Responsive to receiving the interaction, the bubble visualization is updated by adjusting the bubble to include a radial bar graph representative of a relative quantity of each distinct value of the concept represented by the bubble at each indicator of the plurality of indicators.

20 Claims, 12 Drawing Sheets

(56) References Cited

U.S. PATENT DOCUMENTS

2016/0104308 A1\* 4/2016 Allyn ..................... G06T 15/08
  345/440
2016/0364740 A1\* 12/2016 Parker ................ G06Q 30/0205

OTHER PUBLICATIONS

United States First Action Interview Office Action, U.S. Appl. No. 16/038,077, dated Dec. 13, 2018, six pages.
United States First Action Interview Pilot Program Pre-Interview Communication, U.S. Appl. No. 16/038,077, dated Oct. 23, 2018, five pages.

\* cited by examiner

PROGRESSIVE DATA DISTRIBUTION VISUALIZATION

CROSS-REFERENCE TO RELATED APPLICATIONS

This application is a continuation application of U.S. patent application Ser. No. 16/038,077 filed on Jul. 17, 2018, which is incorporated by reference.

TECHNICAL FIELD

The disclosure relates generally to the field of generating visualizations of data sets.

BACKGROUND

Representing large datasets typically requires significant abstraction when visualizing the representation on a computer display. Often, representing large datasets involves averaging, summing, or otherwise summarizing the data in the dataset to succinctly describe it in a manner appropriate for display upon a computer display. Such representations are often data lossy. Furthermore, known techniques that enable selection of portions of the representation to expand upon the details of the selected portion often provide the details in a list or text-based format that does not represent the context of the visualization. The known techniques do not progressively disclose a more granular level of detail without fundamentally shifting the visualization or introducing new panels. Furthermore, known techniques do not sufficiently organize data from multiple data sources into single visualizations.

SUMMARY

Visualizing data using bubbles to represent various concepts within the data enables progressive visualization of the distribution of the data without requiring fundamental shifts to the visualization such as introducing new panels. Techniques include displaying on a visual interface (e.g., a screen or a surface via projection) a bubble representing a concept in a dataset in a bubble visualization. The bubble is based at least in part on a number of distinct values pertaining to the concept and on a number of records in the dataset including at least one of the distinct values pertaining to the concept. Alternatively, the bubble may be based on an importance score, e.g. an importance score based on the number of records that include distinct values pertaining to the concept, or on one or more other factors. Furthermore, the dataset includes records organized into a concept hierarchy. The records may be aggregated from multiple sources (e.g., multiple databases). The bubble includes, for a level of the concept hierarchy, a plurality of indicators each representing one of the distinct values at the level of the concept hierarchy. An interaction with the bubble visualization is received. Responsive to receiving the interaction, the bubble visualization is updated by adjusting the bubble to include a radial bar graph representative of a relative quantity of each distinct value of the concept represented by the bubble at each indicator of the plurality of indicators.

Figure 1:
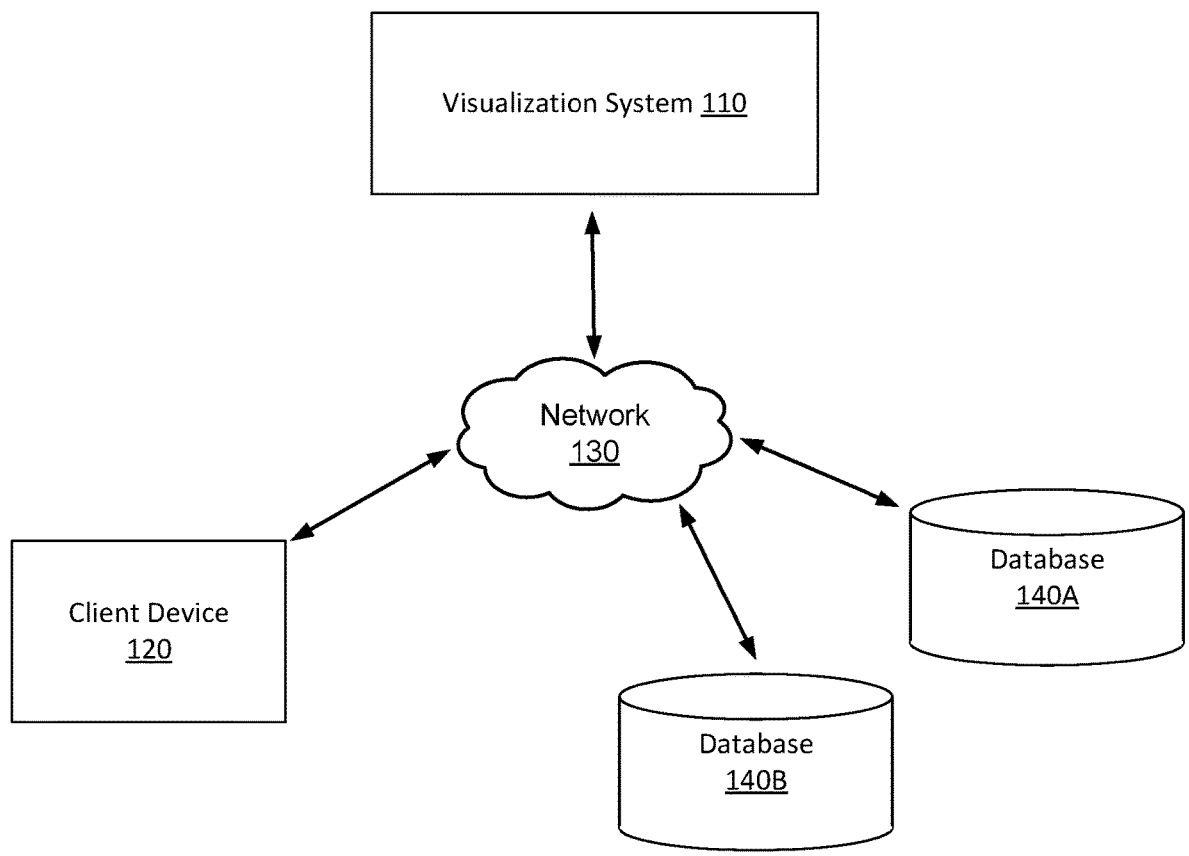
FIG. 1 illustrates an example computer system environment in which the techniques described may be practiced, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. General Overview

How to best visualize large sets of data is an ongoing problem. Simply listing every record in a database is often unfeasible due to the sheer quantity of data, which may include billions or even trillions of records. Existing techniques fail to progressively disclose a more granular level of detail without fundamentally shifting the visualization or introducing new panels. As detailed below, "bubble" graphical elements visualize the records in a dataset, as well as the dataset's hierarchy, in a cogent manner without necessitating fundamental shifts to the visualization.

A bubble is a graphical element representing a concept within a dataset. In an embodiment, a concept is a data label that encompasses multiple values to provide broader semantic context such as state, income, or birthday. Concepts may correspond to one or more columns or portions of columns in a database. Similar columns across databases may be combined into singular concepts, such as a first database's "State," a second database's "ST," and a third database's "Province" being combined to form an "Administrative Region" concept. The present disclosure exemplifies bubbles as circles, though in other embodiments bubbles may be other geometric shapes, such as squares or hexagons. For such embodiments, other aspects of the visualization may be altered as appropriate, such as the radial bar graph described below instead becoming a hexagonal bar graph. Various graphical elements for use in representing data are referenced throughout the present disclosure, such as "dash" and "segment." In general, such data-representing graphical elements are "indicators." The bubble is based at least in part on a number of distinct values pertaining to the concept and on a number of records in the dataset including at least one of the distinct values pertaining to the concept. Alternatively, the bubble may be based on an importance score, e.g. an importance score based on the number of records that include distinct values pertaining to the concept.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

FIG. 1 uses like reference numerals to identify like elements. A letter after a reference numeral, such as "140A," indicates that the text refers specifically to the element having that particular reference numeral. A reference numeral in the text without a following letter, such as "140," refers to any or all of the elements in the figures bearing that reference numeral. For example, "140" in the text refers to reference numerals "140A," and/or "140B" in the figures.

II. System Overview

FIG. 1 illustrates an example computer system environment in which the techniques described may be practiced, according to one embodiment. The computer system environment includes a visualization system 110, a client device 120, and two databases 140, which are connected to each other via a network 130. In other embodiments, different or additional entities can be included in the computer system environment. For example, though only one client 120 is shown in FIG. 1, the computer system environment may include additional client devices 120. Furthermore, in various embodiments the visualization system 110 may be incorporated partially or entirely into the client device 120. The functions performed by the various entities of FIG. 1 may vary in different embodiments.

The visualization system 110 is described in further detail below with reference to FIG. 2. It generates data visualizations to visualize datasets using bubbles. Depending upon the embodiment, the visualization system 110 may also generate user interfaces, analyze data, and generate and use machine learning models.

Each client device 120 includes one or more computing devices capable of processing data as well as transmitting and receiving data over a network 130. For example, a client device 120 may be a desktop computer, a laptop computer, a mobile phone, a tablet computing device, an Internet of Things (IoT) device, or any other device having computing and data communication capabilities. Each client device 120 includes a processor for manipulating and processing data and a storage medium for storing data and program instructions associated with various applications. The storage medium may include both volatile memory (e.g., random access memory) and non-volatile storage memory such as hard disks, flash memory, and external memory storage devices. Each client device 120 may further include or be associated with a visual interface capable of displaying user interfaces and data visualizations, depending upon the embodiment. The visual interface may display user interfaces and data visualizations directly (e.g., on a screen) or indirectly on a surface, window, or the like (e.g., via a visual projection unit). For ease of discussion the visual interface may be described as a display.

Each database 140 may be one or more relational or non-relational databases which store data (e.g., health records) and are communicatively connected to the network 130. In an embodiment, instead of being communicatively connected to the network 130, the one or more databases are part of the visualization system 110. Although the term database is used, is some embodiments, some or all of the data may be stored in other manners. In the example of FIG. 1, database 140A and database 140B are discrete databases, such as the databases of two unrelated hospitals. Each may use a different database schema. For example, database 140A may encode a patient's state of residence in a column "State" while database 140B may encode the same concept in a column "ST" that uses state abbreviations rather than full names. In some embodiments, the visualization system 110 can identify these columns as pertaining to a similar concept and combine said columns into a single bubble in a visualization.

The network 130 may comprise any combination of local area and wide area networks employing wired or wireless communication links. In one embodiment, network 130 uses standard communications technologies and protocols. For example, network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control/protocol/Internet protocol (TCP/IP), hypertext transport protocol (HTTP), simple mail transfer protocol (SMTP), and file transfer protocol (FTP). Data exchanged over the network 130 may be represented using any format, such as hypertext markup language (HTML) or extensible markup language (XML). In some embodiments, all or some of the communication links of the network 130 may be encrypted.

Figure 2:
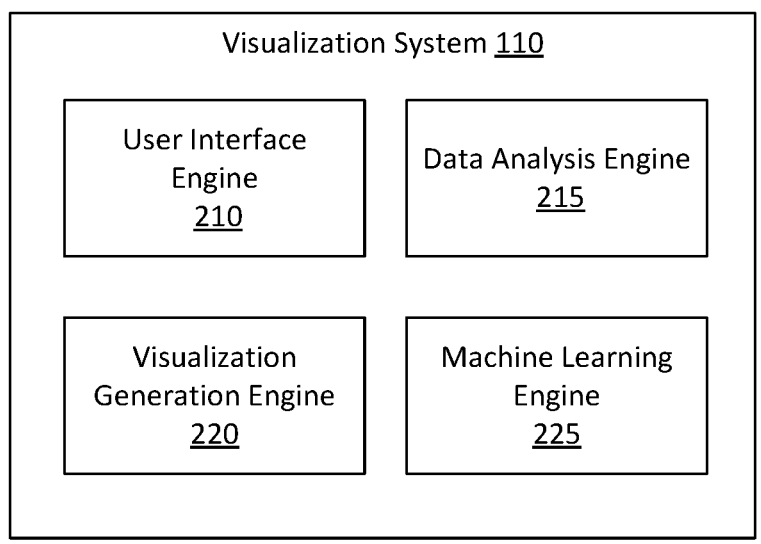
FIG. 2 is a block diagram of a visualization system, according to one embodiment.

FIG. 2 is a block diagram of the visualization system 110, according to one embodiment. In the embodiment shown, the visualization system 110 includes a user interface engine 210, a data analysis engine 215, a visualization generation engine 220, and a machine learning engine 225. In other embodiments the visualization system 110 may include fewer, other, or additional components which may perform functionality other than that described herein. For example, in various embodiments the visualization system 110 may include one or more databases to store data, such as various machine learning models.

The user interface engine 210 generates user interfaces for updating or interacting with databases and visualizations. In particular, the user interface engine 210 may provide user interfaces for display via a client application executing on a client device 120 of a user (e.g., data owner or administrator). For example, the user may use the client device 120 to interact with one or more user interfaces to initiate generation of a visualization, and to view and interact with the generated visualization. The user interface engine 210 can send information such as user input received at the visualization system 110 to the data analysis engine 215, and similarly can receive information such as visualizations from the visualization generation engine 220 to send to client devices 120 for display.

The data analysis engine 215 ingests data from one or more databases 140 and prepares it for use in generating a visualization. For example, the data analysis engine 215 may format the ingested data, store it in a particular data structure, determine concepts within the data—including concepts across source databases 140, similar to the "State" versus "ST" example above—and hierarchies among those concepts, and so on. The hierarchy may be user-created, determined using machine learning techniques, or generated with a combination of both techniques. For example, the user may input a concept hierarchy to the visualization system 110 for use in generating a visualization, or a concept hierarchy may be determined based on the various database schema of each source database. As another example, a machine learning model may be used to determine the hierarchy, based on, for example, the various concepts within the data.

Concepts themselves may be determined by a machine learning model, or may be user-determined. For example, the user may indicate that database 140A has a column "ZIP" that is the same concept as database 140B's column "Zip Code." Additionally or alternatively, a machine learning model may determine this connection. For example, the model may learn that five-digit numbers in a column adjacent to an "Address" column are typically similar (zip codes) and as such may group those five-digit numbers regardless of what their columns are called across a plurality of databases. Similarly, other such inferences may be performed by the machine learning model, based on, for example, analyses of the proximity of columns within various databases.

As a third example, a machine learning model may be used to bin concepts into various groups. Binning may be partially or completely unsupervised. For example, user input may determine a "residency" concept group that includes an "address" concept and a "city" concept, and the model may bin "zip code," "state," "country," and so on into the group. Alternatively, in an embodiment, concept grouping is based entirely on user input and/or a pre-stored set of concept groups. Furthermore, as detailed below, if there are more distinct values for a given concept than a maximum number, the distinct values may be binned into a set of bins with no more than the maximum number of bins. For example, if a "Name" concept includes thousands of distinct values, and the maximum number is 30, the distinct values (names) may each be binned into one of 26 bins, one for each letter of the alphabet, by a first letter of the distinct value (name). In an embodiment, rather than via a model, binning is performed by the data analysis engine 215 whenever the maximum number is surpassed for a concept. In such an embodiment, the data analysis engine 215 may bin the distinct values of the concept into 36 bins based on alphanumeric characters (A-Z and 0-9) of the distinct values (e.g., a first character of the distinct value). Henceforth, for the sake of this disclosure, discussion of a distinct value may further apply to a bin of distinct values; a distinct value may be a bin of distinct values. The data analysis engine 215 may receive user input from the user interface engine 210 and may send data to the visualization generation engine 220.

As a fourth example, a machine learning model may be used to determine an order among distinct values. For example, the machine learning model may be used to analyze patterns across databases to determine an order among distinct values for a given concept, such as days of the week, Zip Codes, or so on. In some embodiments, rather than using a machine learning model, the visualization system 110 receives user input indicating orders for distinct values of one or more concepts. Additionally or alternatively, a default ordering scheme may be used (e.g., alphanumeric ordering) unless a concept-specific ordering scheme is provided by a user or identified using machine-learning (e.g., a default order may be used until a machine-learned ordering scheme exceeds a confidence threshold).

The visualization generation engine 220 generates visualizations of datasets, such as bubble visualizations of health data from multiple databases. The visualization generation engine 220 receives data from the data analysis engine 215 and uses it to generate a visualization. The visualization may be formatted for display upon a client device 120, such as to fit a viewport of a client device 120 or to fit within a user interface that is generated via the user interface engine 210, and may be part of the user interface. In an embodiment, the visualization system 110 sends generated visualizations to client devices 120 for display.

The machine learning engine 225 generates and trains machine learning models for use by the data analysis engine 215. For example, the machine learning engine 225 may generate models for identifying concepts, binning various data, determining hierarchies, and so on. The models may be trained on training data stored in the visualization system 110, which may in turn include data from one or more databases 140. The machine learning engine 225 provides the models for use to the data analysis engine 215. In an embodiment, users may administrate the machine learning process, such as via one or more user interfaces generated by the user interface engine 210.

III. Data Visualization

Figure 3:
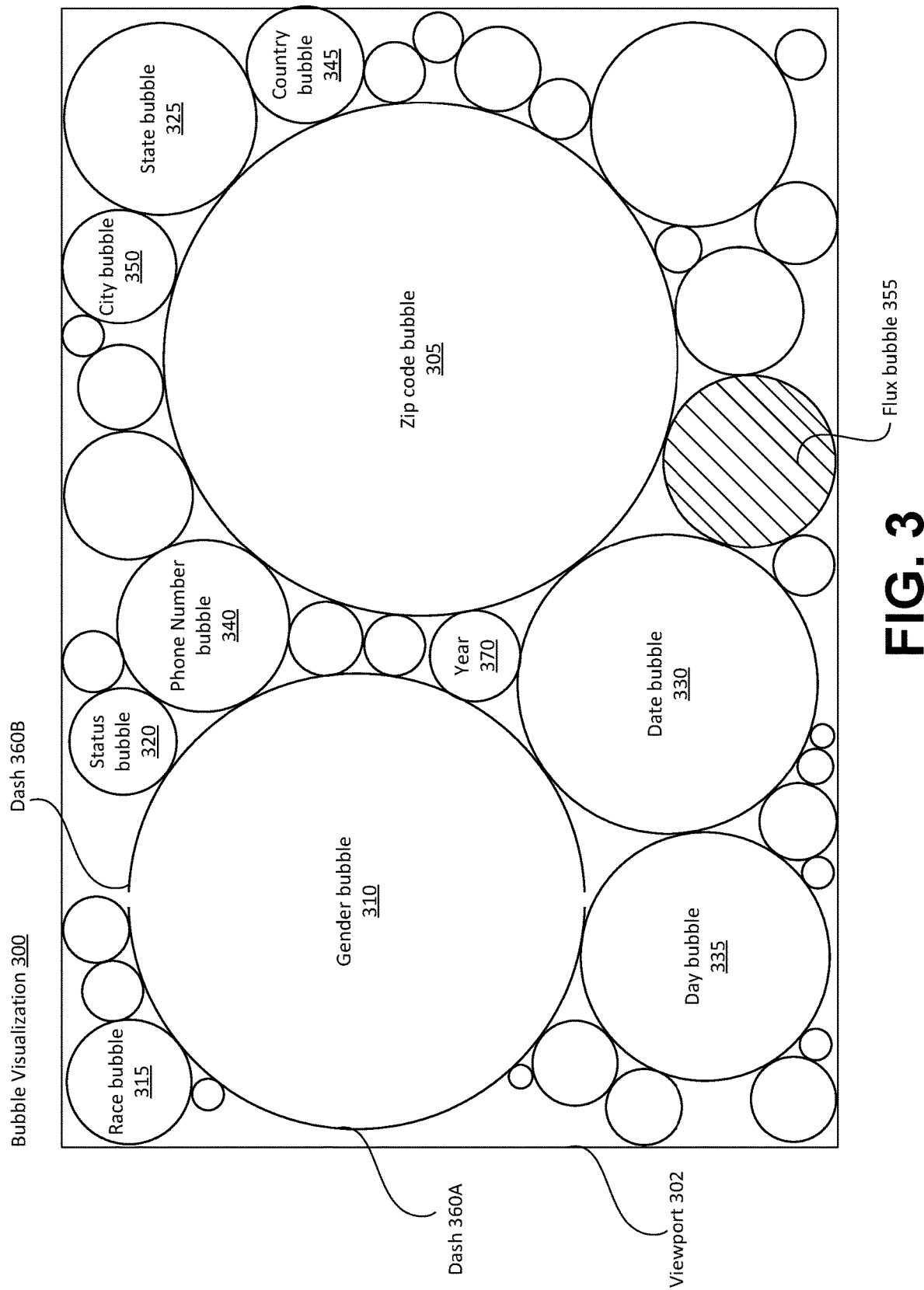
FIG. 3 is a simplified example of a bubble visualization, according to one embodiment.

FIG. 3 is a simplified example of a bubble visualization 300, according to one embodiment. The bubble visualization 300 ("BV") is within a viewport 302. The viewport 302 is a region within which a visualization is constrained. For example, the viewport 302 may map to a display screen of a client device 120. Depending upon the embodiment, the BV 300 may be generated such that it fits entirely within the viewport 302, or may be generated as larger than the viewport 302. In the latter embodiment, the BV 300, or an associated user interface, may be interacted with by user input such that the BV 300 pans, moving a different portion of the BV 300 into the viewport 302. Furthermore, depending upon the embodiment, the BV 300 may be additionally interactive, such as zoom in/out functionality, rotation, and so on.

The BV 300 includes a plurality of bubbles, such as Zip code bubble 305 and Gender bubble 310. The size of a bubble may be determined by an importance score calculated from one or more factors. In one embodiment, each bubble has an area proportional to an amount of data represented by the bubble. For example, if a bubble represents a concept found in 4% of the records in a dataset, the bubble may have an area equal to 4% of the total area of the viewport 302. Alternatively, the size of the bubble may be based on the amount of data represented by the bubble, the relative size of some or all other bubbles, and an amount of viewport space available, measured, for example, in pixels. In other embodiments the importance score for a bubble may be based on different or additional factors, such as: a number of statistical anomalies within the records, an average recency of records added, an area of interest articulated by user input, etc. For example, the size of the bubble may be based on a number of records represented by the bubble with distinct values at least one standard variation from the mean for the distinct value (a number of statistical anomalies). A bubble's size may also be determined based on one or more circle packing techniques. The size of the bubble may be determined by the data analysis engine 215.

In an embodiment, the various bubbles in the BV 300 are located within the viewport 302 based on their relationships with one another, such as based on concept groups. For example, Zip code bubble 305 is located adjacent to City bubble 350, State bubble 325, and Country bubble 345, each of which relates to residency, such as hospital patient's places of residence. Similarly, Date bubble 330, Year bubble 370, and Day bubble 335 are adjacent to one another, as are Gender bubble 310, Race bubble 315, and Status bubble 320 (e.g., citizenship status), which relate to demographic information. Gender bubble 310, Zip code bubble 305, Phone Number bubble 340, etc. each pertain to a general "personal information" category, and as such are located near one another within the BV 300. Many bubbles in the BV 300 lack a textual label (e.g., "Zip code bubble"). In some embodiments, only bubbles with at least a threshold radius or area are labeled by default, and bubbles with less than the threshold are labeled only upon selection. Concept groups may be colored differently from one another. For example, bubbles relating to addresses (Zip code bubble 305, State bubble 325, etc.) may be colored green, while bubbles relating to demographics (Gender bubble 310, Race bubble 315, etc.) may be colored blue. In an embodiment, bubbles representing concepts grouped based on user input are colored, while bubbles grouped using machine learning, and/or ungrouped bubbles, are colored a uniform color, such as white, black, or grey. Additionally or alternatively, once machine learning determines that a bubble belongs to an existing group with at least a threshold probability, the bubble is displayed in the same color as that group.

Flux bubble 355 represents a concept that has undergone significant change within the dataset over a certain period of time. Flux bubbles represent concepts for which more than a threshold number or percentage of respective records have changed within a given time period. Any bubble may be a flux bubble if it meets the criteria, e.g. having the threshold number of changed records within the given time period. For example, if at least a third of the records represented by a bubble are updated within 30 days, the bubble is made a flux bubble. Alternatively, a bubble may become a flux bubble 355 if the bubble changes in size by more than a threshold amount within a certain time period. For example, a bubble may become a flux bubble if the number of records represented by the bubble increases at least 25% within a 30 day period, or if the number of records represented by the bubble decreases at least 10% within a 30 day period. Flux bubbles are distinguished from non-flux bubbles in one or more ways. In the example of the figure, Flux bubble 355 is distinguished using slanted lines within the bubble. In other embodiments, the bubble may include a "halo" such as a highlighting, for example, a yellow ring of color in addition to the typical color of the bubble. In an embodiment, flux bubbles are determined each time a BV 300 is generated, based on analysis of the data in the visualization as compared to a previous state of the same dataset. In other embodiments flux bubbles are determined periodically, e.g. once per day, once per week, or so on. The analysis is performed, for example, by the data analysis engine 215. Furthermore, in some embodiments, one or more bubbles are set as flux bubbles, such as in response to user input, even if the bubbles would not otherwise become flux bubbles.

Gender bubble 310 includes two dashes 360. Each dash 360 is representative of a distinct value within the bubble. In this example, dash 360A represents "male" values and dash 360B represents "female" values. Rather than a solid outline, a bubble may be represented by a number of outlining dashes, with one dash for each distinct value or bin represented by the bubble. Whether or not a bubble is represented by dashes or a solid outline may depend, for example, upon a size of the bubble and a number of dashes necessary to represent the bubble's distinct values or bins. In an embodiment, the data represented by a bubble is binned such that the bubble may be represented by outlining dashes, where each outlining dash is at least a threshold size, e.g. a number of pixels, and such that there is at least a threshold space between dashes, e.g. a number of pixels. For simplicity, the example of the figure includes only the one bubble with a dashed outline, though in other embodiments many or all of the bubbles may have a dashed outline. In an embodiment, all bubbles have dashed outlines, which are rendered as dashed or solid outlines within the BV 300 based on a size of the bubble with respect to the viewport 302. For example, bubbles occupying at least a threshold number of pixels are rendered upon the display of the client device with a dashed outline, whereas bubbles occupying below the threshold number of pixels are rendered with solid outlines until an action such as a zoom-in adjusts the relative size of the bubble such that it surpasses the threshold. Alternatively, all bubbles may have dashed outlines regardless of size.

Figure 4A:
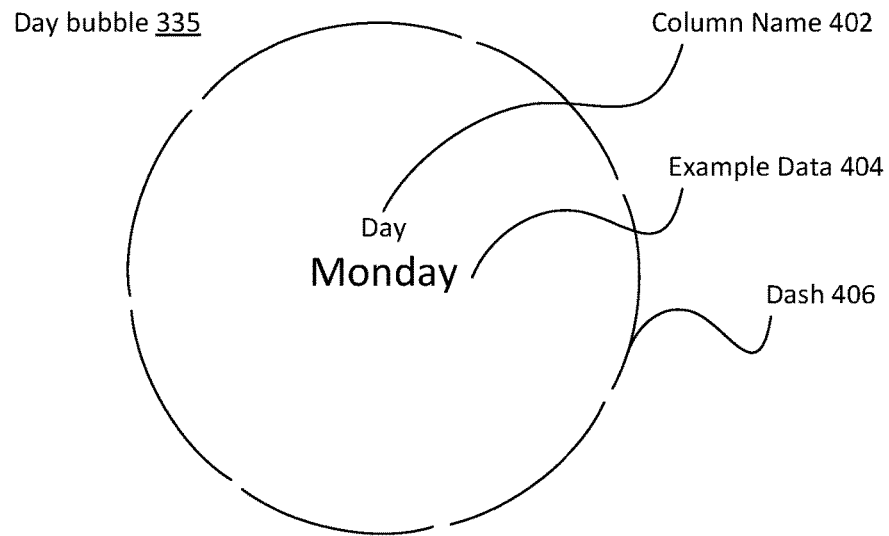
FIG. 4A is a simplified example of a bubble, according to one embodiment.

FIG. 4A is a simplified example of a bubble, according to one embodiment. The bubble is the Day bubble 335, though with a dashed outline rather than a solid outline. There are seven dashes, one for each day of the week. For example, dash 406, which may correspond with "Saturday" distinct values for the concept "Day" found throughout records within the dataset. The dashes are curved to maintain the circular shape of the bubbles in the example. In other embodiments, dashes may be straight lines. The bubble includes a Column Name 402, indicating the concept represented by the bubble. In the case of the Day bubble 335, the Column Name 402 is "Day." In some embodiments, the Column Name 402 is a concept name rather than the name of a column. Depending upon the embodiment, bubbles may or may not include Column Names 402 and/or Example Data 404. Whether or not a bubble includes a column name or example data may also depend upon a size of the bubble. Example Data 404 is an exemplary distinct value for data represented by the bubble. In the example of Day bubble 335, the Example Data 404 is a day, "Monday."

Figure 4B:
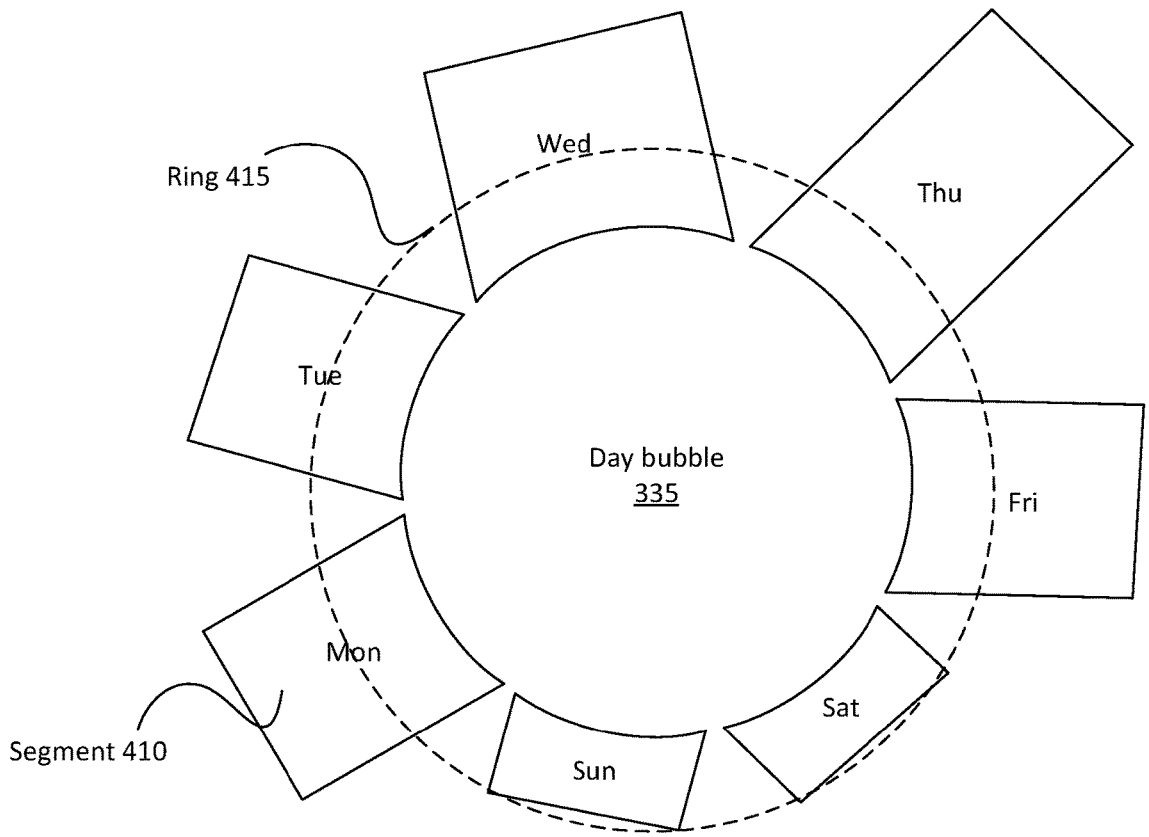
FIG. 4B is a simplified example of a bubble that is interacted with, according to one embodiment.

FIG. 4B is a simplified example of a bubble that is interacted with, according to one embodiment. An example interaction is a hover of a computer mouse. When a bubble is interacted with, such as via user input, its dashes expand into segments. The segments upon the bubble form a radial bar graph. Each segment represents the relative amount or quantity of the segment's distinct value (or bin) as compared to the other distinct values (or bins) for the concept represented by the bubble. For example, in the figure, a "Thursday" segment is the largest, which may indicate Thursday is the most common day for a particular event or activity (e.g., a doctor's appointment). If a dash represents a distinct value (or bin) with no records in the dataset, or with less than a threshold number or percentage of records in the dataset, the segment resulting from interaction may instead alter into an empty segment. An empty segment is distinguished graphically from other segments, such as by changing to a red color, rather than expanding to represent an amount of records with the distinct value (or bin).

Segments may be equally spaced upon the outline of the bubble, and adjacent segments may have spaces of equal size between one another. For example, if the bubble is a circle, the width of each indicator may be determined by:

$$\frac{(\text{bubble circumference}) - (\text{space width}) * (\text{number of segments})}{(\text{number of segments})}$$

where "bubble circumference" is the length of the outline of the bubble, "space width" is the length of the spaces between indicators along the circumference, and "number of segments" is the number of segments displayed for the bubble.

Segment 410 is an example of a segment, representing the distinct value "Monday" for the Day bubble 335. Depending upon the embodiment, segments may include textual labels indicating the distinct value (or bin) represented by the segment. Whether or not the bubble includes segment textual labels may depend upon a size of the bubble and/or the segments. In some embodiments, bubbles, upon interaction, include one or more rings, such as ring 415, that serve as quantity indicators. For example, a ring may be placed about a bubble to represent that a segment extending to the ring represents at least 1000 records with the segment's distinct value. A second ring with larger radius may, for example, be placed about the first ring, to serve as a quantity indicator of a 2000 record magnitude, and so on.

Depending upon the embodiment, the expansion of dashes into segments may be animated within the bubble visualization. For example, the dashes may be animated to expand outward to form the segments.

Figure 5:
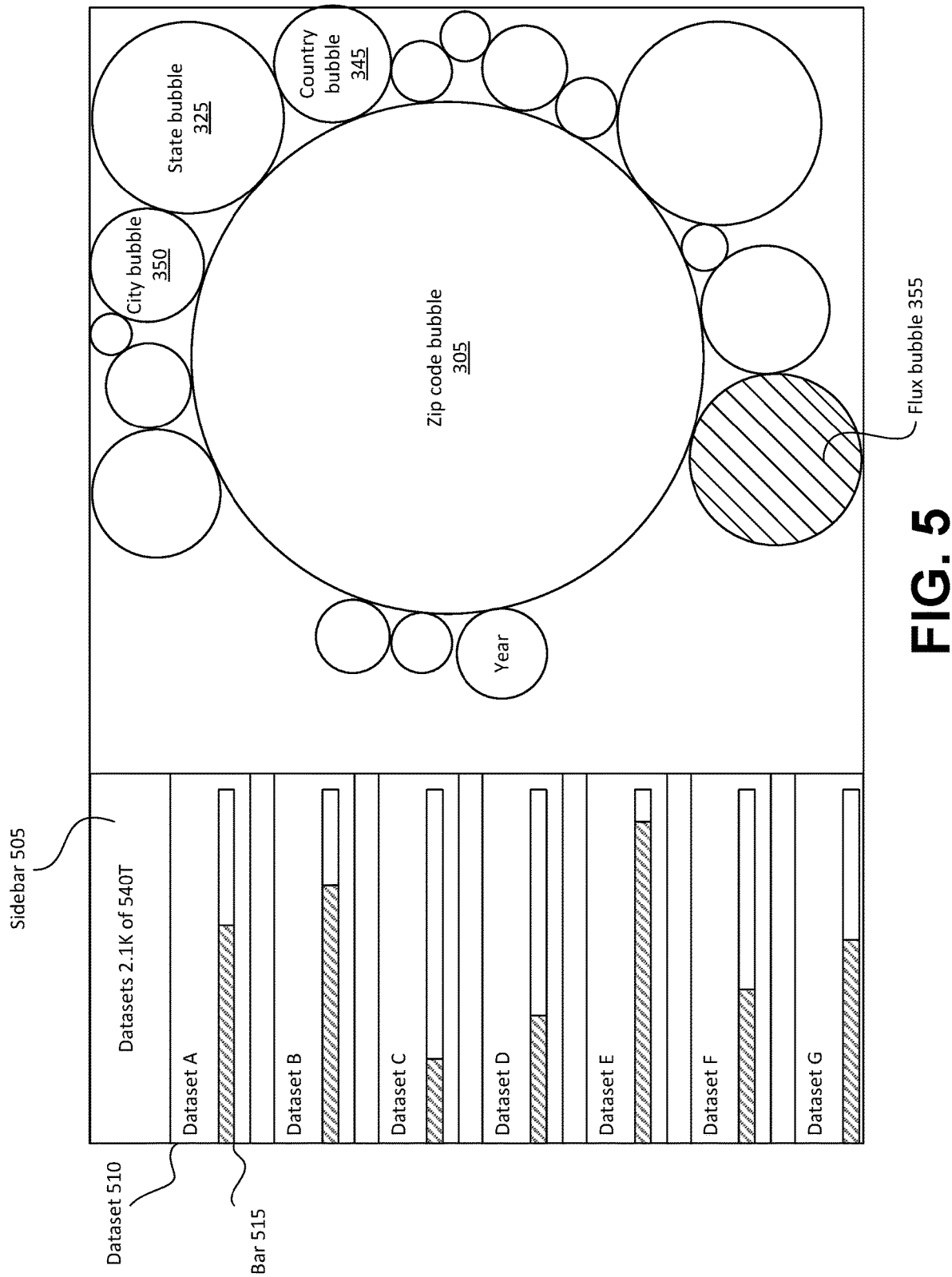
FIG. 5 is a simplified example of a bubble visualization for a selected bubble, according to one embodiment.

FIG. 5 is a simplified example of a bubble visualization for a selected bubble, according to one embodiment. A selected bubble may be, for example, a bubble clicked on using a computer mouse. Upon selection of a bubble, the BV 300 alters. Depending upon the embodiment, the selected bubble is rendered as interacted with, i.e. with each dash expanded into a segment, similar, for example, to the example of FIG. 4B. If such an expanded bubble expands into and overlaps adjacent bubbles, the expanded bubble is overlaid upon the adjacent bubbles, which may fade partially or entirely where overlapped. In the example of FIG. 5, the Zip code bubble 305 is the selected bubble, though in this example its dashes are neither shown nor expanded into segments. However, in other embodiments dashes are always shown. Generally, dashes representing the contained values are displayed around the periphery of the bubble 305. However, these are omitted in FIG. 5 for clarity. Note that in some embodiments, dashes may not be displayed for all bubbles (e.g., dashes may be omitted for bubbles below a threshold size unless they are selected by a user). Furthermore, bubbles representing concepts not present in records represented by the selected bubble are faded or removed from the BV 300. In the example of FIG. 5, such bubbles are removed. In some embodiments, flux bubbles are not removed regardless of which bubble is selected.

The example of FIG. 5 includes Sidebar 505. Depending upon the embodiment, the BV 300 may or may not include a sidebar. The sidebar may include a textual label, such as "Datasets 2.1K of 540 T" in Sidebar 505, representing that the selected bubble represents a concept included in 2,100 of 540,000,000,000,000 records in the dataset. The sidebar may further include entries for each data source from which the dataset is drawn. For example, a first entry, Dataset 510, is for "Dataset A" and includes Bar 515. Bar 515 is a bar indicating how many or what percentage of the records in Dataset A include a distinct value represented by the selected bubble. Depending upon the embodiment, datasets 510 and bars 515 may be any of a variety of colors, sizes, shapes, or other visual features. For example, a dataset 510 may include a text string indicating what percentage of the records in the database include a distinct value represented by the selected bubble, e.g. "found in 53% of records" rather than a bar 515.

Figure 6:
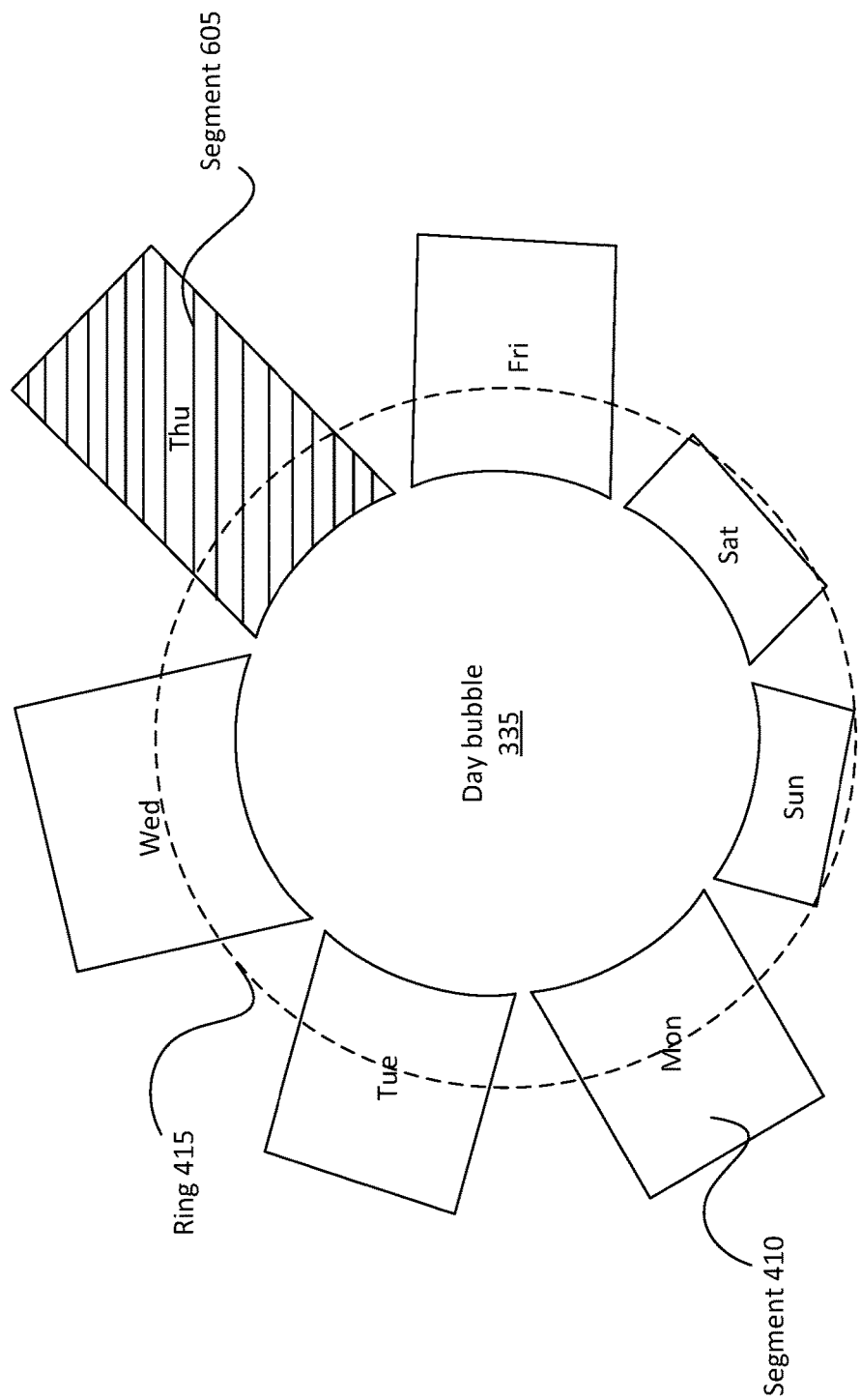
FIG. 6 is a simplified example of a bubble with a segment that is interacted with, according to one embodiment.

FIG. 6 is a simplified example of a bubble with a segment that is interacted with, according to one embodiment. The Day bubble 335 includes seven segments, one for each day of the week, such as segment 410, representing Monday. In some embodiments, a first distinct value of multiple ordered distinct values for a concept is represented by a dash at the top of the bubble, with each subsequent ordered distinct value following along the edge of the bubble clockwise or, is an embodiment, counterclockwise. The bubble further includes a ring 415. Segment 605 is a segment that is interacted with. This is represented in the figure by slanted lines, though in other embodiments may be indicated by other visual elements, such as a highlighting, a different color, a pattern, or so on. For example, a segment that is interacted with may be a lighter shade of a color of the bubble. Depending upon the embodiment, the interaction may be a computer mouse hover, or so on.

Figure 7:
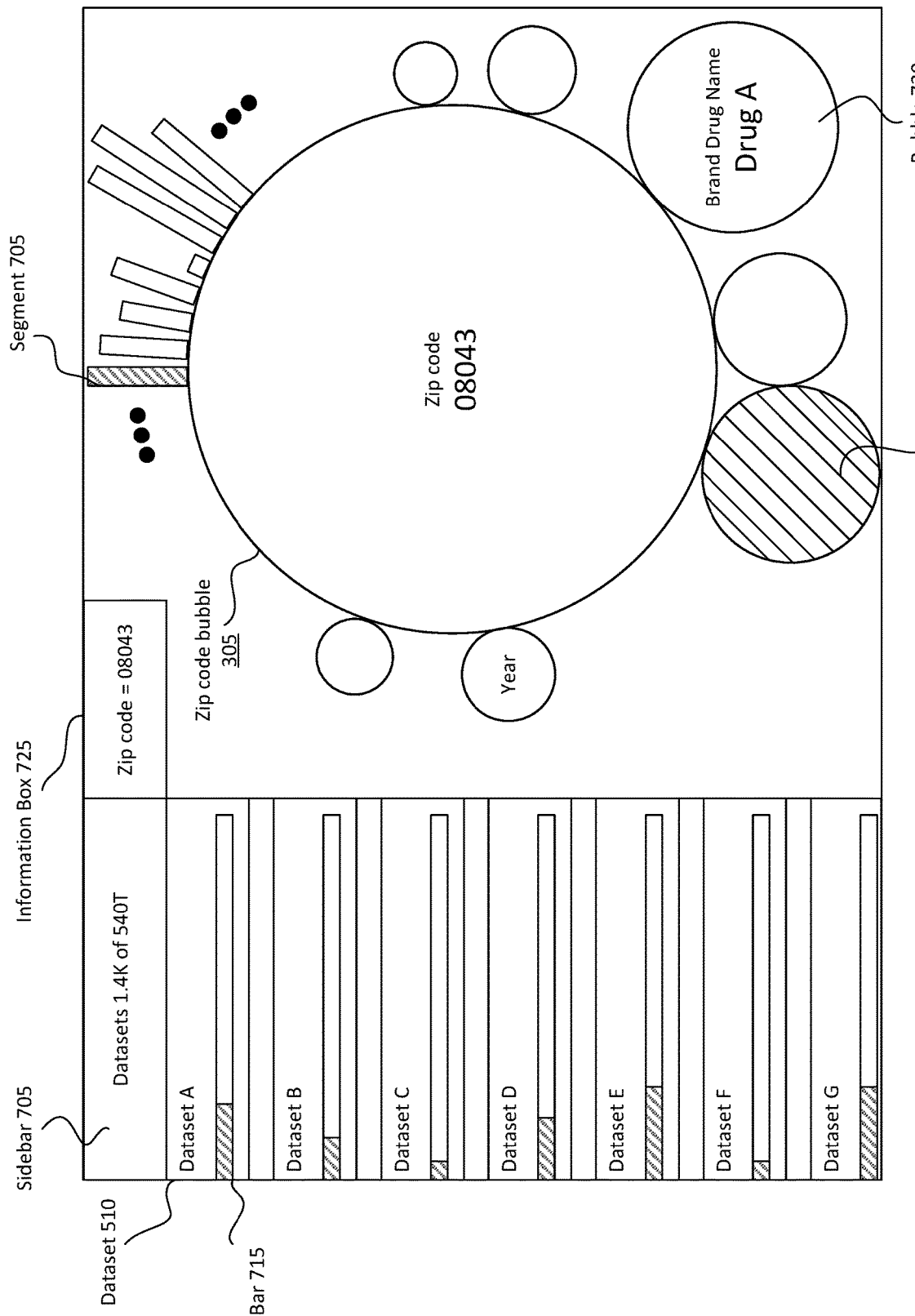
FIG. 7 is a simplified example of a bubble visualization with a segment that is interacted with, according to one embodiment.

FIG. 7 is a simplified example of a bubble visualization with a segment that is interacted with, according to one embodiment. Segment 705 of selected Zip code bubble 305 is interacted with, as represented by slanted lines within the segment. The slanted lines are for understandability and do not correspond to the slanted lines of the flux bubble 355. Depending upon the embodiment, a selected segment such as segment 705 and a flux bubble 355 may be distinguished using any of a variety of graphical features, such as color, highlighting, pattern, or so on, and in various embodiments have partially or completely different distinguishing graphical features. Interaction with a segment further specifies the data represented in the visualization for records containing the particular distinct value represented by the segment that is interacted with. For example, bubbles representing concepts for records that do not include the distinct value of the interacted-with segment are faded or removed; in the example of the figure, such bubbles are removed. For simplicity of the figure, the zip code bubble 305 is shown with a solid outline, and only several of its segments are shown.

The selected bubble, Zip code bubble 305, includes as its Example Data the distinct value (e.g., the zip code) of the segment that is interacted with. In the example of the figure, this is zip code "08043." The BV includes a sidebar 705, with an updated textual label "Datasets 1.4K of 540 T" indicating that fewer records include the distinct value of the interacted-with segment than a distinct value of the concept in general, as in FIG. 5. Similarly, the bars in the sidebar 705 show that less of each dataset is represented by the interacted-with segment than the bubble as a whole. For example, bar 715, again for dataset 510, is representative of a lower percentage of Dataset A than bar 515. Information box 725 includes "Zip code=08043." The information box 725 indicates the particular filters applied to the dataset via interaction with the BV. For example, interaction with segment 705 filters the records visualized in the BV to specifically visualize records including zip code 08043.

Bubble 730 includes Column Name "Brand Drug Name" and Example Data "Drug A." Upon filtering of data such as by interaction with a segment, bubbles previously without Column Names, Example Data, etc. may include such labels. For example, in embodiments where interaction with a bubble zooms in towards the bubble, thereby increasing the area of it and adjacent bubbles, which may cause the bubble 730 to be large enough for text while before it was not. In some embodiments, such as the embodiment of the figure, flux bubbles such as flux bubble 355 are not faded or removed upon filtering.

Figure 8:
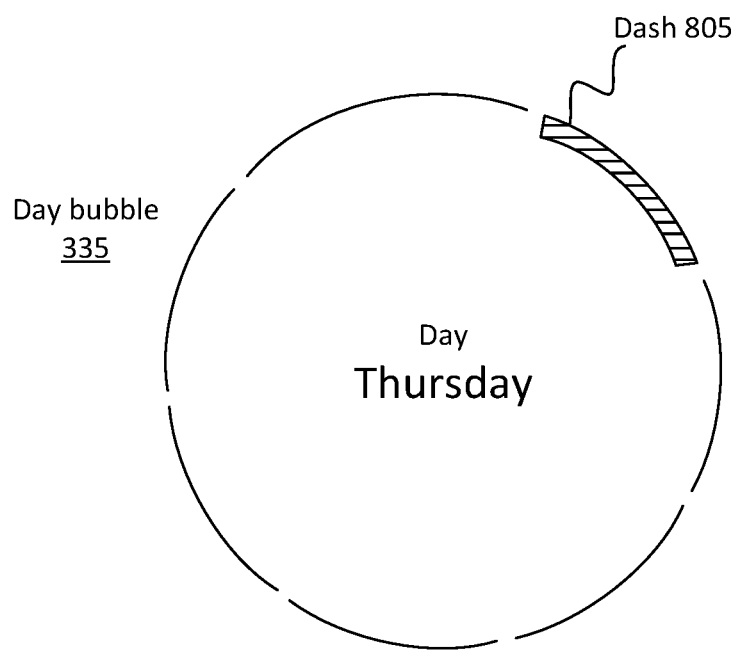
FIG. 8 is a simplified example of a bubble with a selected segment, according to one embodiment.

FIG. 8 is a simplified example of a bubble with a selected segment, according to one embodiment. Upon selection of a segment (rather than simple interaction with a segment), the bubble adjusts to indicate the selected segment. For example, for Day bubble 335, upon selection of the segment representing "Thursday," the segments contract back into dashes and the dash corresponding to the selected segment, dash 805, is highlighted within the bubble to indicate the selection of that distinct value. The dash 805 may be enlarged, colored differently, have a pattern not applied to the other dashes, e.g. slanted lines like in the figure, or so on. Furthermore, the Example Data changes to the distinct value or bin that is selected, e.g. "Thursday." As detailed below, if the hierarchy of the data includes sub-types to the distinct value of a selected segment, sub-dashes may be included in the bubble.

Figure 9:
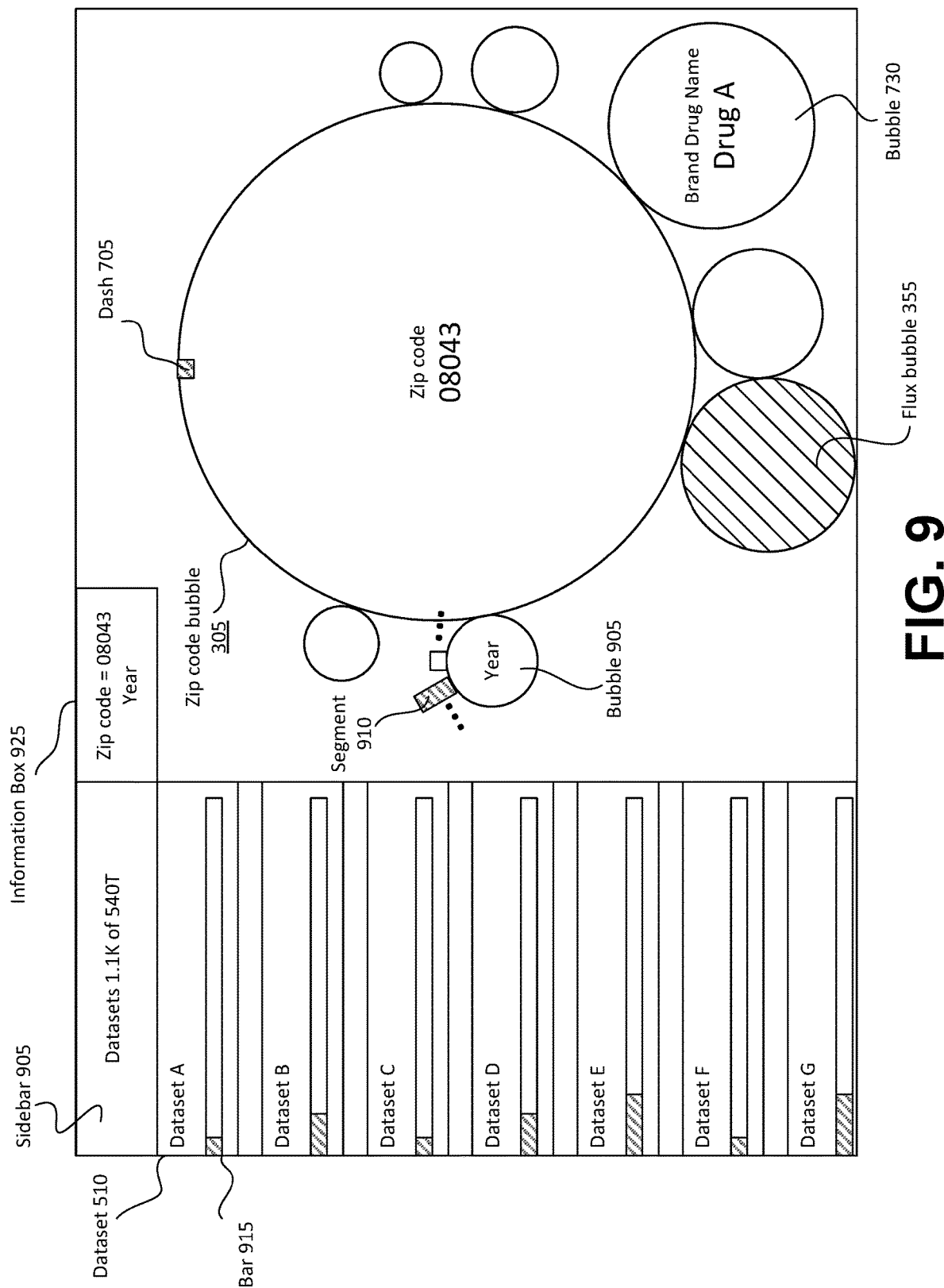
FIG. 9 is a simplified example of a bubble visualization with multi-bubble interaction, according to one embodiment.

FIG. 9 is a simplified example of a bubble visualization with multi-bubble interaction, according to one embodiment. Zip code bubble 305 includes a dash 705 that has been selected. As such the BV has filtered accordingly. Furthermore, Segment 910 of Bubble 905 is interacted with, further filtering the data. Information Box 925 reflects this, including not just "Zip code=08043" but also "Year" which is the concept represented by Bubble 905. The Sidebar 905 also reflects the additional filtering, with a text label indicating the reduced number of records including the filtered data. Likewise, bar 915 reflects the lower amount of Dataset A that includes the particular zip code 08043 and the particular year of segment 910. Such a multi-bubble interaction may filter the records, for example, to persons residing in zip code 008043 and who were born in the particular year represented by segment 910. For simplicity, each bubble is shown with a solid outline, and only two segments of bubble 905 are shown.

Figure 10:
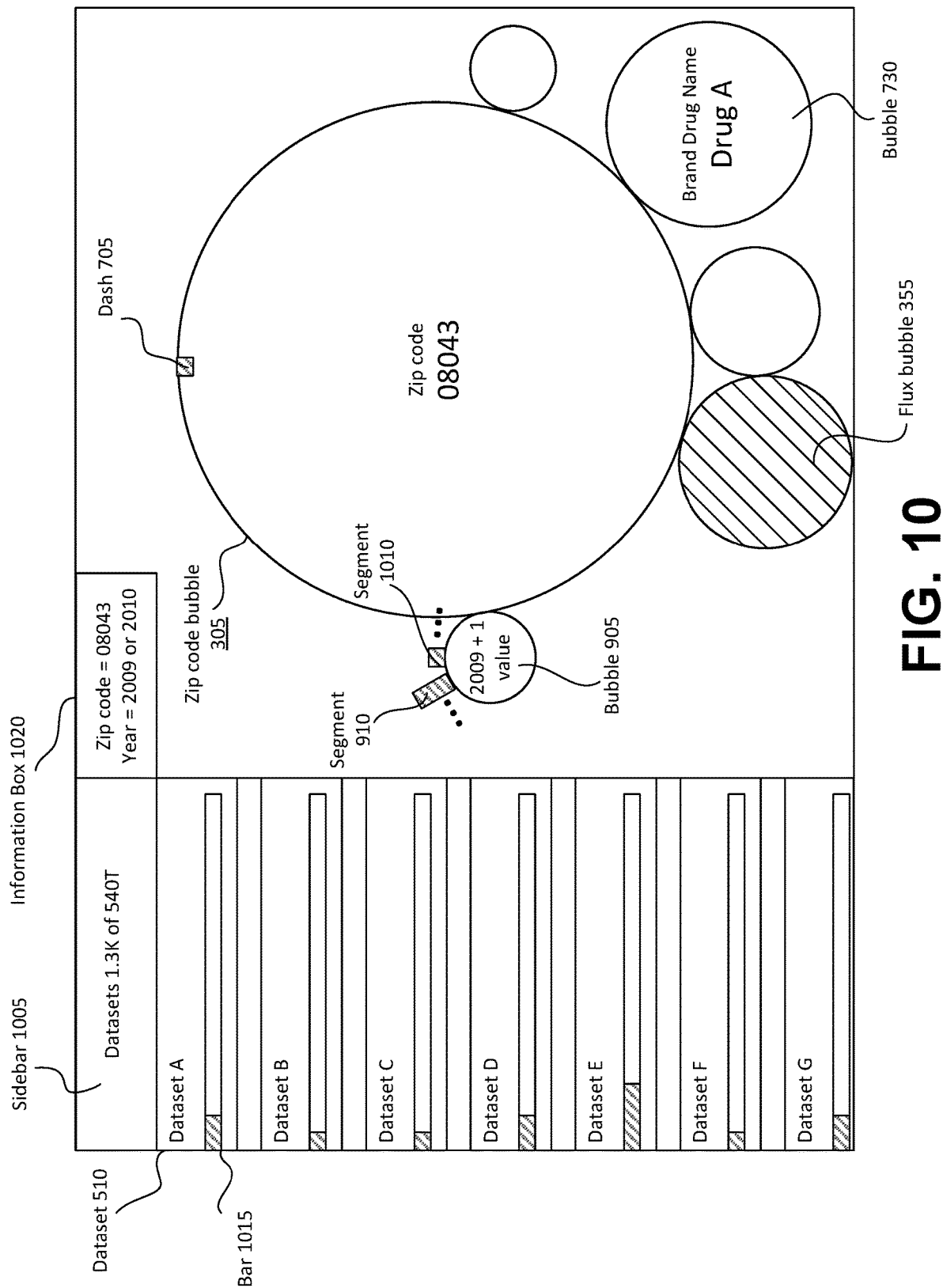
FIG. 10 is a simplified example of a bubble visualization with multi-segment interaction, according to one embodiment.

FIG. 10 is a simplified example of a bubble visualization with multi-segment interaction, according to one embodiment. The example of the figure is similar to that of FIG. 9. However, both Segment 910 and Segment 1010 of Bubble 905 are selected. As such, the BV filters to include records with either the distinct value of segment 910 or the distinct value of record 1010. Bubble 905 includes a textual label "2009+1 value" to indicate that multiple distinct values are selected. Similarly, information box 1020 includes "Zip code=08043" and "Year=2009 or 2010" to indicate the concepts and distinct values involved in the filtering. Likewise, Sidebar 1005 indicates "Datasets 1.3K of 540 T" which is a greater number of records than in FIG. 9, in accordance with the selection of multiple years rather than just one. Bar 1015 is accordingly representative of the larger amount of data in Dataset A that includes either year 2009 or 2010, rather than just one.

Figure 11A:
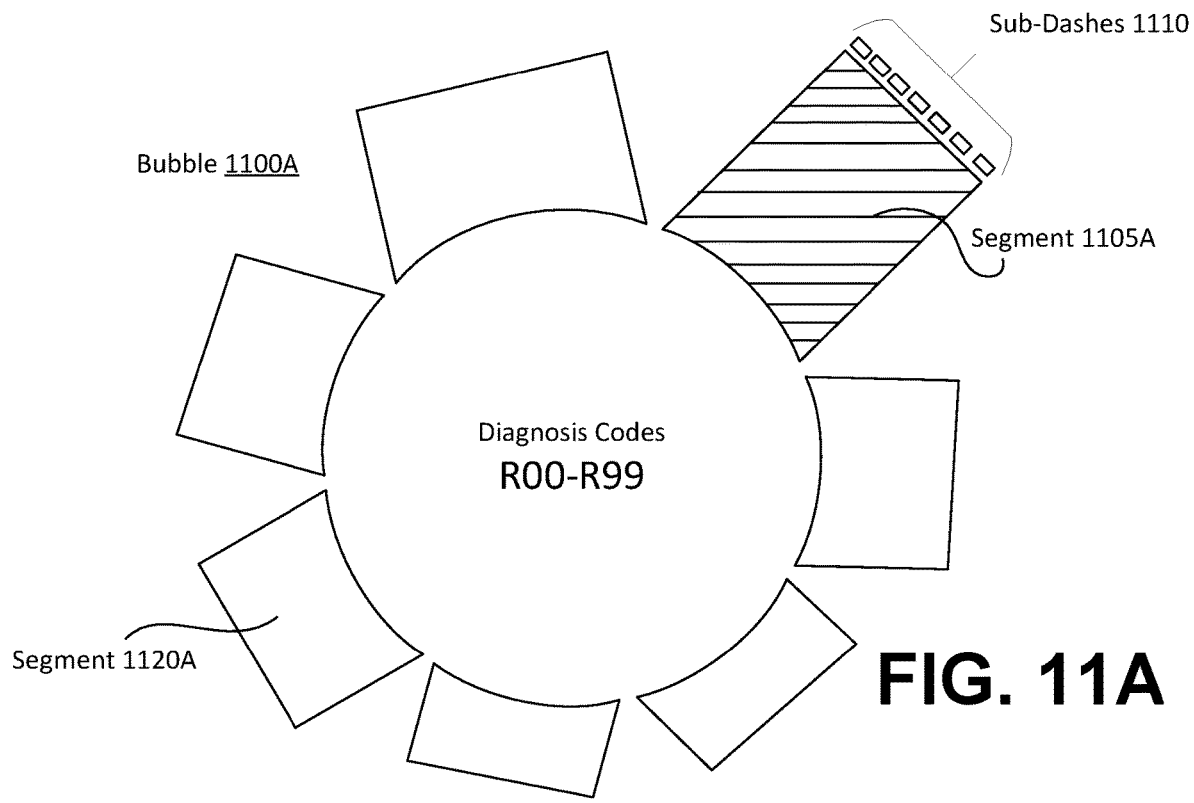
FIG. 11A is a simplified example of a bubble with sub-dashes, according to one embodiment.

FIG. 11A is a simplified example of a bubble with sub-dashes, according to one embodiment. If the hierarchy of the data includes sub-categories for distinct values, segments may include sub-dashes that represent the sub-categories. Or, if distinct values are binned and each dash represents a bin, the distinct values within the bin may be sub-dashes. For example, if a bubble 1100A represents a "diagnosis codes" concept ranging from R00 to R99, binned into 7 bins, each represented by a dash (and corresponding segment), each of the dashes (and segments) will include sub-dashes for the particular diagnosis codes within the bin. For example, segment 1105A includes sub-dashes 1110, each of which is a value lower in the hierarchy than the value represented by segment 1105A. Each sub-dash 1110 represents a diagnosis code from R43 to R49. If segment 1105A is selected, the segments may contract, the dash corresponding to segment 1105A may appear within the bubble, and the sub-dashes 1110 may move to the outside of the bubble, as seen in the example of FIG. 11B.

Figure 11B:
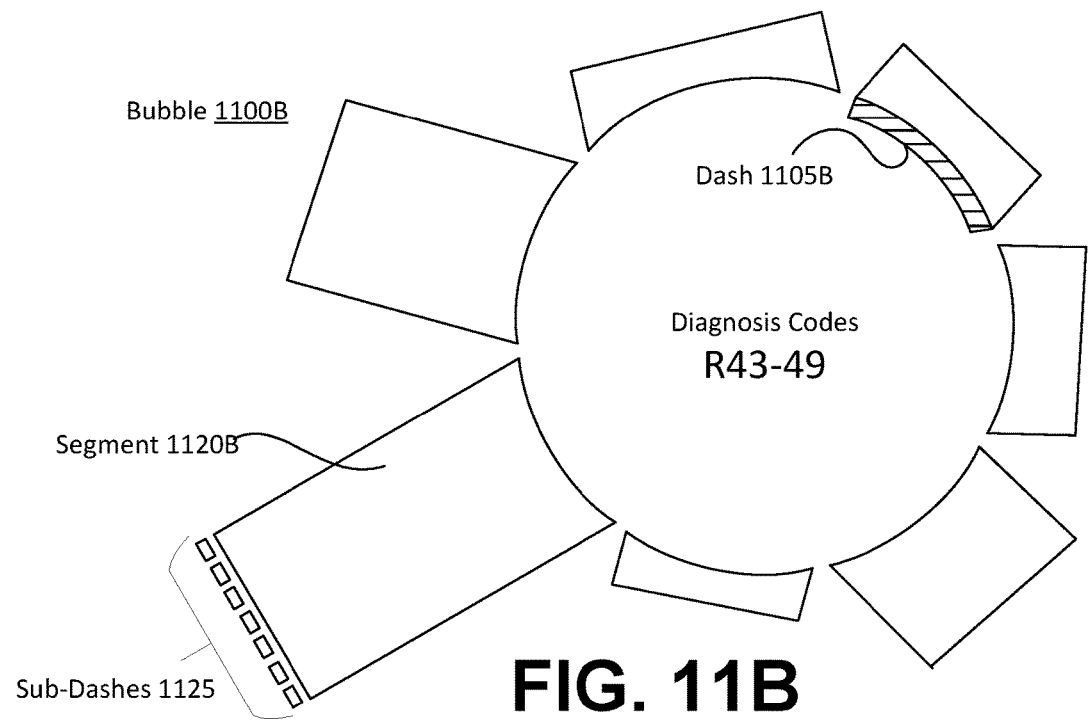
FIG. 11B is a simplified example of a bubble with a selected segment and sub-dashes, according to one embodiment.

FIG. 11B is a simplified example of a bubble with a selected segment and sub-dashes, according to one embodiment. Dash 1105B corresponds to segment 1105A, which upon selection contracts into the dash 1105B. The sub-dashes 1110 move onto the bubble as segments, each representing its distinct value's relative amount. For example, segment 1120A is a bin of diagnosis codes in bubble 1100A, but segment 1120B, in the same location as segment 1120A but in the updated bubble 1100B, represents a particular diagnosis code in the R43-R49 range. There can be multiple levels to hierarchies, which may be represented as additional sub-dashes, such as sub-dashes 1125. For example, these may be diagnosis codes R44.1, R44.2, and so on. If Segment 1120B is selected, it moves into the interior of the bubble, and depending upon the embodiment dash 1105B remains or is removed. In an embodiment, the interior dash corresponding to segment 1120B moves farther into the interior of the bubble than dash 1105B to represent the lower layer of the hierarchy it represents. Upon selection of segment 1120B, sub-dashes 1125 move onto the bubble from the segment, forming a third set of segments for the bubble. Though in this example each level of the hierarchy represented by dashes or segments includes seven distinct values, in other embodiments other numbers of distinct values may exist and may vary between levels of the hierarchy. For example, a bubble may have 24 dashes each representing an hour, each of which may have 60 sub-dashes each representing a minute. Alternatively, the bubble may have 24 dashes each representing an hour, and 12 sub-dashes each representing a five minute interval, where each of the 12 sub-dashes has 5 of its own sub-dashes, each representing a singular minute, and so on.

IV. Visualization Process

Figure 12:
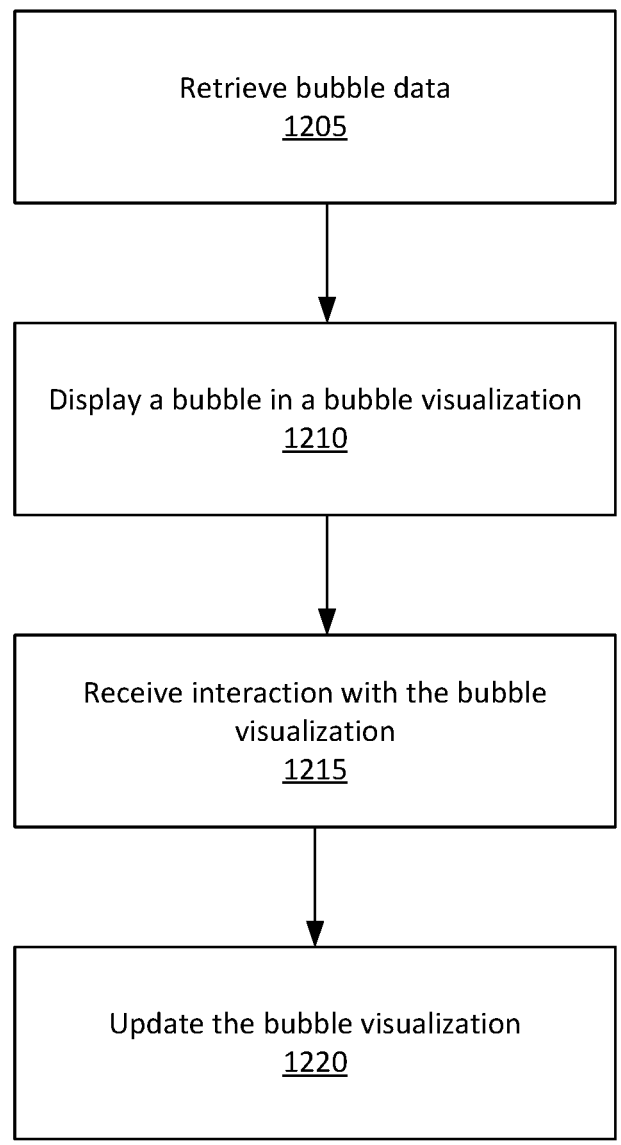
FIG. 12 is a flowchart illustrating a visualization method, according to one embodiment.

FIG. 12 is a flowchart illustrating a visualization method, according to one embodiment. In the embodiment shown in FIG. 12, a client device retrieves 1205 bubble data from a dataset. The client device 120 displays 1210 a bubble based on the bubble data in a bubble visualization. The bubble may be generated by the visualization system 110. Client device 120 receives 1210 an interaction with the bubble visualization. For example, the client device 120 receives a hover over or a click interaction with the bubble. In an embodiment, the interaction is communicated to the visualization system 110. The client device 120 updates 1215 the bubble visualization in response to receiving 1210 the interaction. In an embodiment, the bubble visualization is updated 1215 after receiving an update from the visualization system 110. For example, the visualization system 110 may receive the interaction from the client device 120 and update the bubble visualization based on the interaction, then send the update to the client device 120 which updates the bubble visualization based on the update. Depending upon the embodiment, the bubble visualization includes a plurality of bubbles and/or additional graphical elements.

V. Additional Considerations

The disclosed bubble visualizations may provide several advantages over existing user interfaces. Some embodiments may be more efficient because they progressively disclose a more granular level of detail without fundamentally shifting the visualization or introducing new panels. Furthermore, a bubble visualization may organize data from multiple data sources into a single visualization. For example, the data represented by a bubble may originate from several data sources, and presentation of a radial bar graph of the bubble does not significantly alter the overall context presented by the bubble visualization. Furthermore, in one embodiment, flux bubbles improve efficiency by assisting a user to quickly and easily identify areas of significant change. One of skill in the art may recognize additional advantages that may be realized using the described techniques.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 2. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process visualizing data using bubbles through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims

What is claimed is:

1. A method comprising:
retrieving, from a dataset including concept data having a concept hierarchy comprising a plurality of levels of concepts, bubble data corresponding to a concept in the dataset, wherein the bubble data includes, for a particular level of the concept hierarchy, a number of distinct values pertaining to the concept and a number of records in the dataset that include distinct values pertaining to the concept;
providing for display a visualization including a bubble for the concept, the bubble comprising a geometric shape and indicators arranged around a periphery of the geometric shape, each indicator corresponding to one of the distinct values at the particular level of the concept hierarchy;
receiving an indication of user-selection of the bubble for the concept; and
providing for display, responsive to receiving the indication, an updated bubble visualization comprising adjusted indicators that each indicate a relative quantity of the number of records in the dataset that include the distinct value corresponding to the adjusted indicator.

2. The method of claim 1, further comprising:
receiving an indication of an interaction with a particular adjusted indicator in the bubble visualization;
adjusting the bubble visualization to filter the records visualized by the bubble visualization based on the distinct value corresponding to the particular adjusted indicator; and
displaying the adjusted bubble visualization.

3. The method of claim 2, further comprising:
receiving a second indication of a second interaction with a second adjusted indicator;
adjusting the bubble visualization to additionally filter the records visualized by the bubble visualization based on the distinct value corresponding to the second adjusted indicator; and
displaying the adjusted bubble visualization.

4. The method of claim 2, further comprising:
adjusting the bubble visualization to include a set of sub-indicators at the periphery of the particular adjusted indicator, wherein each sub-indicator in the set of sub-indicator represents a different distinct value at a next level of the concept hierarchy associated with the distinct value of the concept represented by the particular adjusted indicator at the particular level of the concept hierarchy; and
displaying the adjusted bubble visualization.

5. The method of claim 4, further comprising:
receiving a second indication of a second interaction with the particular adjusted indicator;
responsive to receiving the second indication, adjusting the bubble visualization to include an adjusted bubble comprising the particular adjusted indicator in an interior of the adjusted bubble and the set of sub-indicators as indicators at an exterior outline of the adjusted bubble; and
displaying the adjusted bubble visualization.

6. The method of claim 1, wherein adjusting the plurality of indicators comprises initiating an animation, the animation comprising an indicator of the plurality of indicators expanding outward from the bubble to form an adjusted indicator, wherein a limit of the outward expansion of the indicator is proportional to the relative quantity of the distinct value of the concept represented by the indicator with respect to the other distinct values corresponding to the concept.

7. The method of claim 1, further comprising:
obtaining a determination that the bubble represents a concept for which at least a threshold number of records in the dataset have changed within a threshold period of time;

adjusting the bubble such that it is visually distinguished from bubbles that represent concepts for which less than the threshold number of records in the dataset have changed within the threshold period of time; and displaying the adjusted bubble in the bubble visualization.

8. A non-transitory computer-readable storage medium storing computer program instructions executable by a processor to perform operations, the operations comprising:

retrieving, from a dataset including concept data having a concept hierarchy comprising a plurality of levels of concepts, bubble data corresponding to a concept in the dataset, wherein the bubble data includes, for a particular level of the concept hierarchy, a number of distinct values pertaining to the concept and a number of records in the dataset that include distinct values pertaining to the concept;

providing for display a visualization including a bubble for the concept, the bubble comprising a geometric shape and indicators arranged around a periphery of the geometric shape, each indicator corresponding to one of the distinct values at the particular level of the concept hierarchy;

receiving an indication of user-selection of the bubble for the concept; and providing for display, responsive to receiving the indication, an updated bubble visualization comprising adjusted indicators that each indicate a relative quantity of the number of records in the dataset that include the distinct value corresponding to the adjusted indicator.

9. The non-transitory computer-readable storage medium of claim 8, the operations further comprising:

receiving an indication of an interaction with a particular adjusted indicator in the bubble visualization;

adjusting the bubble visualization to filter the records visualized by the bubble visualization based on the distinct value corresponding to the particular adjusted indicator; and displaying the adjusted bubble visualization.

10. The non-transitory computer-readable storage medium of claim 9, the operations further comprising:

receiving a second indication of a second interaction with a second adjusted indicator;

adjusting the bubble visualization to additionally filter the records visualized by the bubble visualization based on the distinct value corresponding to the second adjusted indicator; and displaying the adjusted bubble visualization.

11. The non-transitory computer-readable storage medium of claim 9, the operations further comprising:

adjusting the bubble visualization to include a set of sub-indicators at the periphery of the particular adjusted indicator, wherein each sub-indicator in the set of sub-indicator represents a different distinct value at a next level of the concept hierarchy associated with the distinct value of the concept represented by the particular adjusted indicator at the particular level of the concept hierarchy; and displaying the adjusted bubble visualization.

12. The non-transitory computer-readable storage medium of claim 11, the operations further comprising:

receiving a second indication of a second interaction with the particular adjusted indicator;

responsive to receiving the second indication, adjusting the bubble visualization to include an adjusted bubble comprising the particular adjusted indicator in an interior of the adjusted bubble and the set of sub-indicators as indicators at an exterior outline of the adjusted bubble; and displaying the adjusted bubble visualization.

13. The non-transitory computer-readable storage medium of claim 8, wherein adjusting the plurality of indicators comprises initiating an animation, the animation comprising an indicator of the plurality of indicators expanding outward from the bubble to form an adjusted indicator, wherein a limit of the outward expansion of the indicator is proportional to the relative quantity of the distinct value of the concept represented by the indicator with respect to the other distinct values corresponding to the concept.

14. The non-transitory computer-readable storage medium of claim 8, the operations further comprising:

obtaining a determination that the bubble represents a concept for which at least a threshold number of records in the dataset have changed within a threshold period of time;

adjusting the bubble such that it is visually distinguished from bubbles that represent concepts for which less than the threshold number of records in the dataset have changed within the threshold period of time; and displaying the adjusted bubble in the bubble visualization.

15. A system, comprising:

a processor; and a non-transitory computer-readable storage medium storing computer program instructions executable by the processor to perform operations, the operations comprising:

retrieving, from a dataset including concept data having a concept hierarchy comprising a plurality of levels of concepts, bubble data corresponding to a concept in the dataset, wherein the bubble data includes, for a particular level of the concept hierarchy, a number of distinct values pertaining to the concept and a number of records in the dataset that include distinct values pertaining to the concept;

providing for display a visualization including a bubble for the concept, the bubble comprising a geometric shape and indicators arranged around a periphery of the geometric shape, each indicator corresponding to one of the distinct values at the particular level of the concept hierarchy;

receiving an indication of user-selection of the bubble for the concept; and providing for display, responsive to receiving the indication, an updated bubble visualization comprising adjusted indicators that each indicate a relative quantity of the number of records in the dataset that include the distinct value corresponding to the adjusted indicator.

16. The system of claim 15, the operations further comprising:

receiving an indication of an interaction with a particular adjusted indicator in the bubble visualization;

adjusting the bubble visualization to filter the records visualized by the bubble visualization based on the distinct value corresponding to the particular adjusted indicator; and displaying the adjusted bubble visualization.

17. The system of claim 16, the operations further comprising:

receiving a second indication of a second interaction with a second adjusted indicator;

adjusting the bubble visualization to additionally filter the records visualized by the bubble visualization based on the distinct value corresponding to the second adjusted indicator; and displaying the adjusted bubble visualization.

18. The system of claim 16, the operations further comprising:

adjusting the bubble visualization to include a set of sub-indicators at the periphery of the particular adjusted indicator, wherein each sub-indicator in the set of sub-indicator represents a different distinct value at a next level of the concept hierarchy associated with the distinct value of the concept represented by the particular adjusted indicator at the particular level of the concept hierarchy; and displaying the adjusted bubble visualization.

19. The system of claim 18, the operations further comprising:

receiving a second indication of a second interaction with the particular adjusted indicator;

responsive to receiving the second indication, adjusting the bubble visualization to include an adjusted bubble comprising the particular adjusted indicator in an interior of the adjusted bubble and the set of sub-indicators as indicators at an exterior outline of the adjusted bubble; and displaying the adjusted bubble visualization.

20. The system of claim 15, the operations wherein adjusting the plurality of indicators comprises initiating an animation, the animation comprising an indicator of the plurality of indicators expanding outward from the bubble to form an adjusted indicator, wherein a limit of the outward expansion of the indicator is proportional to the relative quantity of the distinct value of the concept represented by the indicator with respect to the other distinct values corresponding to the concept.

* * * * *